2,746,969
AMINOALKYLBENZENE DERIVATIVES

Frank Villani and Domenick Papa, Brooklyn, N. Y., assignors to Schering Corporation, Bloomfield, N. J., a corporation of New Jersey No Drawing. Application August 3, 1950, Serial No. 177,572

5 Claims. (Cl. 260—296)

This invention relates to a group of new aminoalkylbenzene derivatives having antispasmodic and antihistaminic properties and to methods of making them.

The new compounds of the invention may be represented by the general formula

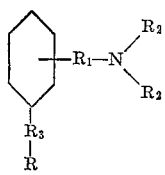

wherein R represents a phenyl or pyridyl ring, $R_1$ is a saturated aliphatic radical of 1 to 4 carbon atoms, $R_2$ is lower alkyl, for example, methyl, ethyl or propyl, and $R_3$ represents $=CO$, $=CHOH$, or $=CH_2$.

Typically the compounds of the invention may be prepared by the Friedel-Crafts reaction of an acid chloride, such as picolinyl chloride or benzoyl chloride with an appropriately substituted phenalkylamine to yield the corresponding benzophenone or benzoylpyridine. The keto group may be reduced successively to the CHOH and the $CH_2$ group. The amino group may be alkylated or acylated either before or after the Friedel-Crafts reaction or the reduction operations. Other methods of making the compounds of the invention will appear from the specific examples.

The following typical examples are illustrative of the products and methods of the application:

EXAMPLE 1

*2-[p-(β-N,N-dimethylaminoethyl)benzoyl]pyridine*

Forty-three grams (0.35 mole) picolinic acid is converted into the acid chloride hydrochloride by stirring in an ice bath for three hours with 250 cc. of thionyl chloride. Most of the thionyl chloride is removed in vacuo on the steam bath. One hundred and fifty cc. of dry nitrobenzene is added and 44.7 g. N,N-dimethyl-β-phenethylamine is added slowly with stirring. Stirring is continued while 132 g. of aluminum chloride is added portionwise. After 8 hours on the steam bath, the dark mixture is poured into ice and HCl, and the nitrobenzene removed by steam distillation. The residue is cooled and filtered from the diphenyl sulfoxide formed and the filtrate made strongly alkaline with NaOH, extracted with ether or chloroform, dried and distilled. There is obtained a yellow oil, B. P. 190–198° C. (3 mm.), which crystallizes. Recrystallization from a large volume of ethanol gives white crystals, M. P. 147.5–148° C. The oxime of the ketone of this example has a melting point of 121–121.5° C.

EXAMPLE 2

*2-[p-(β-N,N-dimethylaminoethyl)benzyl]pyridine*

To 18 g. of sodium dissolved in 500 cc. of ethylene glycol, there is added 35 g. hydrazine hydrate (100%) and 12.7 g. of 2-[p-(β-N,N-dimethylaminoethyl)benzoyl]pyridine, and the mixture is refluxed for 30 hours. The light orange liquid is poured into 1 liter of water and extracted with ether. The ether extracts are washed thoroughly with water, dried over sodium sulfate and distilled, B. P. 148–158° C. at 1 mm.; $n_D^{25}=1.5618$.

EXAMPLE 3

*2-[o-(β-N,N-dimethylaminoethyl)benzoyl]pyridine*

A solution of 45.6 g. of N,N-dimethyl-o-bromo-β-phenethylamine in 250 cc. of anhydrous ether is added, in the course of 1½–2 hours, to 14 g. of lithium wire. The reaction mixture is heated under reflux and after one hour there is added 20.8 g. of 2-cyanopyridine. Following the addition of the cyanopyridine, the mixture is heated for an additional hour on the steam bath, then decomposed in the conventional manner. The ether layer is separated, washed with water, dried and after removing the solvent, the residue is distilled. The compound of this example is obtained as a yellowish, somewhat viscous, liquid boiling at 190–195° C./2–3 mm.

EXAMPLE 4

*2-[o-(β-N,N-dimethylaminoethyl)benzyl]pyridine*

The compound of this example is obtained in the same manner as described for the corresponding isomeric compound of Example 2. It is a pale yellow liquid distilling at 150–155° C./1 mm.

EXAMPLE 5

*2-[p-(N,N-dimethylaminoethyl)benzoyl]pyridine*

This substance is obtained by the procedure outlined for the corresponding homologous compound in Example 1 using N,N-dimethylbenzylamine. The product is obtained as a yellowish oil, B. P. 185–195° C./2–3 mm.

EXAMPLE 6

*p-(N,N-dimethylaminomethyl)phenyl-2-pyridylcarbinol*

The keto amine of Example 5 on reduction with Raney nickel catalyst in 95% ethanol at room temperature and at a pressure of 2–3 atmospheres of hydrogen is quantitatively converted to the carbinol of this example.

EXAMPLE 7

*2-[p-(N,N-dimethylaminomethyl)benzyl]pyridine*

By the method described in Example 2 the keto amine of Example 5 is reduced to the benzyl pyridine derivative of this example in good yield. The substance is isolated as described for the corresponding ethyl compound of Example 2 and after distillation is obtained as a yellowish liquid, B. P. 145–150° C./1–2 mm.

EXAMPLE 8

*2-[p-(α-aminoethyl)benzyl]pyridine*

Twenty-one grams 2-(p-acetylbenzyl)pyridine and 25 g. ammonium formate are heated with a free flame to 150–155° C. until the initial reaction has set in. The mixture is then held at 190–210° C. for 2 hours, poured into water and extracted with benzene. The benzene extracts are warmed on a steam bath for 2 hours with 150 cc. concentrated HCl. After cooling, the aqueous layer is made strongly alkaline, extracted with ether, dried and distilled, B. P. 153–160° C./2 mm.; $n_D^{28}=1.5762$.

EXAMPLE 9

*2-[p-(α-dimethylaminoethyl)benzyl]pyridine*

Ten grams of 2-p-(α-aminoethyl)benzyl pyridine are warmed on the steam bath with 17 g. formic acid and 5 cc. formalin for 6 hours. One hundred cubic centimeters of concentrated HCl is added and the solution evaporated to dryness in vacuo. The residue is dissolved in water, the aqueous solution made alkaline, extracted with ether, dried and distilled. There is obtained the product of this example boiling at 157–161° C./2–3 mm.; $n_D^{27}=1.5592$.

EXAMPLE 10

*p-(β-N-acetylaminoethyl)benzophenone*

Sixty grams of aluminum chloride are added gradually with stirring to a mixture of 46.4 g. benzoyl chloride, 49 g. N-acetyl-β-phenethylamine and 150 cc. nitrobenzene. After 8 hours on the steam bath, the cooled reaction mixture is poured onto ice and extracted with ether or chloroform. The organic extracts are washed with NaOH, dried and distilled. The main fraction distills as a viscous yellow oil, B. P. 210–240° C./1 mm. The oxime prepared in the usual manner melts at 178–179° C.

EXAMPLE 11

*p-(β-aminoethyl)benzophenone* p-(β-N-acetylaminoethyl)benzophenone (47 g.), 50 cc. ethanol and 50 cc. concentrated HCl are refluxed for 4 hours, cooled and made basic with NaOH, and extracted with ether. After drying, the ether extracts are distilled, B. P. 230–260° C./1 mm. After recrystallization from ether, the amino compound of this example melts at 82–84° C.

EXAMPLE 12

*p-(β-N-dimethylaminoethyl)benzophenone*

This compound is prepared in the same manner as in Example 9 using formaldehyde and formic acid, B. P. 166–169° C./1 mm.; $n_D^{25}=1.5790$.

EXAMPLE 13

*p-(β-N,N-diethylaminoethyl)benzophenone*

Crude p-(β-aminoethyl)benzophenone is ethylated with diethylsulfate in an alkaline solution, B. P. 176–180° C./2 mm.; $n_D^{23}=1.5858$.

EXAMPLE 14

*p-(β-Aminoethyl)diphenylcarbinol*

Eighteen grams of zinc dust are added to 17.8 g. p-(β-N-acethylaminoethyl)benzophenone and 18 g. NaOH in 180 cc. of 95% ethanol. The mixture is heated for 3 hours under reflux, filtered and the filtrate poured into large volume of water, neutralized with acetic acid and extracted with ether. The carbinol of this example is obtained as a yellow oil boiling at 195–208° C./1 mm.

EXAMPLE 15

*p-(β-Aminoethyl)diphenylmethane*

Thirty-five grams of sodium are dissolved in 1,000 cc. ethylene glycol. Forty-five grams of hydrazine hydrate and 26.6 g. p-(β-N-acetylaminoethyl)benzophenone are added and heated at 170–180° for 30 hours, poured into 2 liters of water and extracted with ether, dried and distilled; B. P. 135–140° C./3 mm.; $n_D^{31}=1.5743$.

EXAMPLE 16

*p-(β-N,N-dimethylaminoethyl)diphenylmethane* p-(β-aminoethyl)diphenylmethane is methylated with formic acid and formaldehyde; B. P. 136–140° C./1 mm.; $n_D^{29}=1.5520$.

EXAMPLE 17

*4-[p-(β-N,N-dimethylaminoethyl)benzoyl]pyridine*

By the procedure of Example 1, isonicotinic acid is converted into the compound of this example and is obtained after recrystallization from ethyl alcohol as a white crystalline compound.

EXAMPLE 18

*4-[o-(β-N,N-dimethylaminoethyl)benzoyl]pyridine*

By the procedure of Example 3, 4-cyanopyridine is converted into the compound of this example. This tertiary amine is obtained as a pale yellowish liquid boiling at 186–190° C./0.5 mm.

EXAMPLE 19

*4-[p-(β-N,N-dimethylaminoethyl)benzyl]pyridine*

Reduction of the benzoyl compound of Example 17 by the procedure of Example 2 gives the 4-substituted compound as a yellow to colorless liquid boiling at 156–160° C./2–3 mm.

The compounds of the invention may be used in the form of the free bases or in the form of the salts thereof with inorganic acids, such as hydrochloric, hydrobromic, sulfuric and phosphoric acids and with organic acids such as salicylic, tartaric, maleic, succinic, citric and lactic acids.

We claim:

1. Compounds of the general formula

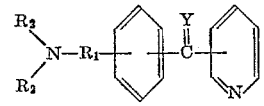

wherein R₁ is a saturated aliphatic hydrocarbon radical of 1 to 4 carbon atoms, R₂ are lower alkyl groups and Y is a number of the group consisting of 2H; H and OH; and O.

2. 2-[p-(β-N,N-dimethylaminoethyl)benzoyl]pyridine of the formula

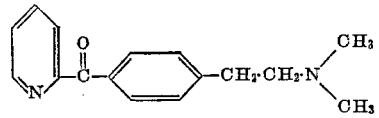

3. 2[p-(β-N,N-dimethylaminoethyl)benzyl]pyridine of the formula

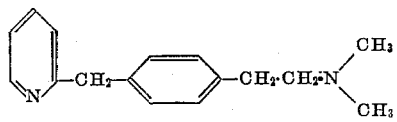

4. 2[o-(β-N,N-dimethylaminoethyl)benzyl]pyridine of the formula

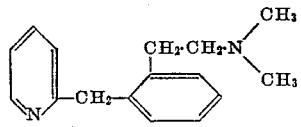

5. 4-[p-(β-N,N-dimethylaminoethyl)benzyl]pyridine of the formula

References Cited in the file of this patent

UNITED STATES PATENTS 2,104,726    Addinall _____ Jan. 11, 1938

FOREIGN PATENTS 41,751    Germany _____ Apr. 10, 1887
42,853    Germany _____ Apr. 9, 1902

OTHER REFERENCES

Speer: J. Org. Chem., vol. 2 (1937), pp. 139–147.